US006585465B1

(12) United States Patent
Hammond et al.

(10) Patent No.: US 6,585,465 B1
(45) Date of Patent: Jul. 1, 2003

(54) MOTOR VEHICLE CARGO RESTRAINT SYSTEM

(75) Inventors: William Douglas Hammond, Bloomfield Village, MI (US); Chris S Nowicki, Armada, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/140,908

(22) Filed: May 7, 2002

(51) Int. Cl.[7] .................................................. B60P 7/08
(52) U.S. Cl. ........................ 410/104; 410/105; 410/106
(58) Field of Search ............................ 410/8, 104, 105, 410/106, 116; 24/115 K, 265 CD; 248/499

(56) References Cited

U.S. PATENT DOCUMENTS

| | | | | | |
|---|---|---|---|---|---|
| 2,052,914 A | * | 9/1936 | Williams | | |
| 4,248,558 A | * | 2/1981 | Lechner | ...................... | 410/104 |
| 4,850,769 A | * | 7/1989 | Matthews | .................... | 410/105 |
| 4,969,784 A | * | 11/1990 | Yanke | ........................ | 410/104 |
| 5,259,711 A | * | 11/1993 | Beck | ........................... | 410/104 |
| 5,409,335 A | * | 4/1995 | Beck | ........................... | 410/105 |
| 5,533,848 A | * | 7/1996 | Davis | ......................... | 410/105 |
| 5,674,033 A | * | 10/1997 | Ruegg | ........................ | 410/104 |
| 5,823,724 A | * | 10/1998 | Lee | .............................. | 410/104 |
| 6,142,718 A | | 11/2000 | Kroll | .......................... | 410/106 |

* cited by examiner

Primary Examiner—Stephen T. Gordon
(74) Attorney, Agent, or Firm—Laura C. Hargitt

(57) ABSTRACT

A motor vehicle cargo restraint system has manually operated tie-down loops that are easily latched and locked to rails fastened to the vehicle structure adjoining a cargo space on the vehicle. The tie-down loops are latchable and lockable to the rails in a plurality of locations spaced along the rails. The number of tie-down loops and rails and the orientation of the rails may be varied according to the particular cargo space and the cargo restraint desired.

5 Claims, 6 Drawing Sheets

MOTOR VEHICLE CARGO RESTRAINT SYSTEM

TECHNICAL FIELD

This invention relates to motor vehicle cargo restraint systems and more particularly to those employing tie-down loops to retain cargo in place in the cargo space of a motor vehicle.

BACKGROUND OF THE INVENTION

It is desirable that the cargo carried in the cargo space of motor vehicles such as vans and trucks be restrained to prevent the cargo from shifting during vehicle operation. And especially during abrupt vehicle turning maneuvers and rapid acceleration and deceleration.

Typically, motor vehicle manufacturers provide for such cargo restraint by installing anchoring devices commonly referred to as "cargo tie-down loops" or "cargo tie-down rings" at various locations on the vehicle. For example, the tie-down loops may be located along interior sides of the vehicle, on the cargo floor and/or on a cargo-carrying roof. The tie-down loops are adapted to receive cargo-restraining lines such as straps and ropes, and are commonly fixed with a threaded fastener to the vehicle structure with no provision for their relocation to a different site or sites better suited for restraining cargo of a particular shape and size. As proposed in U.S. Pat. No. 6,142,718, the tie-down loops may include a push-lock feature whereby the tie-down loops are, with a pushing effort, fastened and locked in a blind manner in mounting holes provided in the vehicle structure. In the latter case, the tie-down loops cannot be unfastened for relocation as can be done with a threaded connection.

As a result and to meet the restraint requirements of a wide range of cargo having various shapes and sizes, there can be provided an abundance of tie-down loops fastened at various locations on the vehicle. There can also be provided an abundance of attaching points on the vehicle structure for those tie-down loops that can be unfastened allowing the latter to be relocated at selected ones of the available attaching points to best suit a particular cargo.

However, the provision of a large number of fixed tie-down loops in an effort to cover a wide range of cargo shapes and sizes is costly. Relocation of those tie-down loops that can be unfastened can be very time consuming, as well as require a tool such as a wrench and considerable manual effort in order to fix them in a new location.

SUMMARY OF THE INVENTION

The present invention provides the vehicle user with a cargo restraint system having cargo anchoring devices that can be easily manually located and latched and locked without a tool in a plurality of locations so as to best suit a particular cargo. This is accomplished with rails that are fixed to the vehicle structure, and anchoring devices that are referred to here-in-after as tie-down loops and are easily latched and locked with little manual effort to the rails at a plurality of latching locations spaced along the length of the rails. Moreover, the rails are versatile in that they may be fixed in various orientations to existing side structure of the vehicle bordering the cargo space, the cargo floor of the vehicle, and/or on the roof of the vehicle in the case of where the vehicle is adapted to carry cargo there.

The rails are all alike and are a relatively simple thin wall hollow part with each rail having a back wall that is fixed to the vehicle and a front wall that faces the cargo carrying space of the vehicle. The front wall has a centrally located channel extending there along and a plurality of latching notches that are located on opposite sides of the channel in laterally aligned pairs at spaced positions along the channel and interior of the rail.

The tie-down loops are also all alike and have a latching mechanism including a pawl and a spring wherein the pawl is adapted to be received through the channel in a selected one of the rails. By manual pushing on the tie-down loop against the spring, partial turning of the tie-down loop and then manual positioning of the tie-down loop along the rail, the pawl is selectively locatable opposite the aligned pairs of latching notches in the front wall of the rail. With the tie-down loop in a position on the rail selected to best suit the restraint of a particular cargo by a restraint line passing through the tie-down loop, the tie-down loop is manually released allowing the pawl to engage the selected aligned pair of notches to latch and lock the tie-on loop to the rail.

The cargo restraint system of the present invention is quite versatile in that the number of rails installed on the vehicle, as well as their location, can be varied by the vehicle manufacturer, and the number of tie-down loops supplied by the vehicle manufacturer can also be varied as one or more tie-down loops can be employed with each rail. The number of rails and their orientation and the number of tie-down loops can be specially ordered for installation by a customer to suit special needs. The cargo restraint system with various numbers of rails and tie-down loops can be simply added to a vehicle as an after market accessory.

It is therefore an object of the present invention to provide a new and improved motor vehicle cargo restraint system.

Another object is to provide a motor vehicle cargo restraint system having tie-down loops that are easily manually positioned, latched and locked in a multitude of locations to best suit various cargo shapes and sizes.

Another object is to provide a motor vehicle cargo restraint system having rails and tie-down loops wherein the rails are fixed to the vehicle structure and the tie-down loops are easily manually positioned along and spring latched and locked to the rails in any one of a plurality of selectable locations spaced along the rails.

These and other objects, advantages and features of the present invention will become more apparent from the following description and accompanying drawings of an exemplary embodiment of the invention.

DESCRIPTION OF EXEMPLARY EMBODIMENTS

Figure 1:
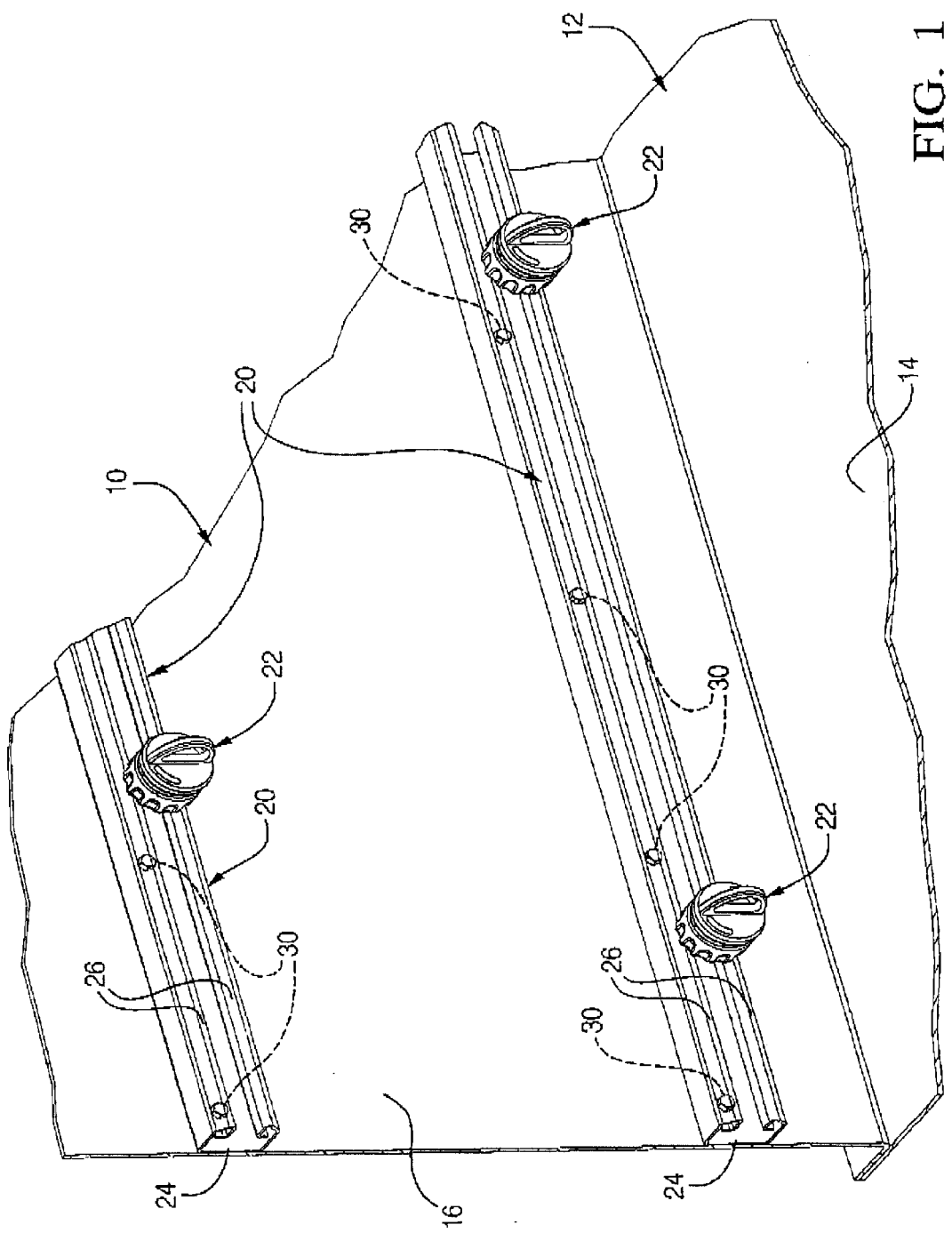
FIG. 1 is a partial three-dimension view of a motor vehicle cargo restraint system according to the invention.

Referring to FIG. 1, there is shown a portion of the interior of a motor vehicle 10 having a rear cargo carrying space 12 wherein the vehicle structure defining the cargo space includes a cargo floor 14 and a side panel 16 at one side of the cargo floor. And it will be understood that in defining the cargo space, the cargo floor extends to a similar side panel at the opposite side of the vehicle.

A cargo restraint system that provides for restraining cargo (not shown) placed on the cargo floor 14 comprises a pair of rails 20 and tie-down loops 22 associated with the side panel 16. The rails 20 are all alike and the tie-down loops 22 are all alike and it will be understood that like rails and tie-down loops are associated with the side panel that adjoins the cargo floor at the opposite side of the vehicle.

The rails 20 are straight one-piece hollow parts formed from sheet metal and have a rear wall 24 and a divided front wall 26 that is spaced from and parallel to the rear wall. The rear wall 24 of the rails has pierced holes 28 spaced there along by which the rails are adapted to be fixed by suitable fastening means to the vehicle structure, as for example by bolts 30 that thread into weld nuts 32 welded to backside of the side panel 16. See FIGS. 1 and 5–7. And in this exemplary embodiment, the rails 20 are arranged parallel to each other in horizontal positions extending longitudinally of the vehicle. With further regard to the rail fastening means, it will be understood that other suitable fasteners such as those having a female threaded member that can be fixed to the vehicle structure from the cargo side can be employed and particularly in the case where the cargo restraint system is added as an after market accessory.

Figure 2:
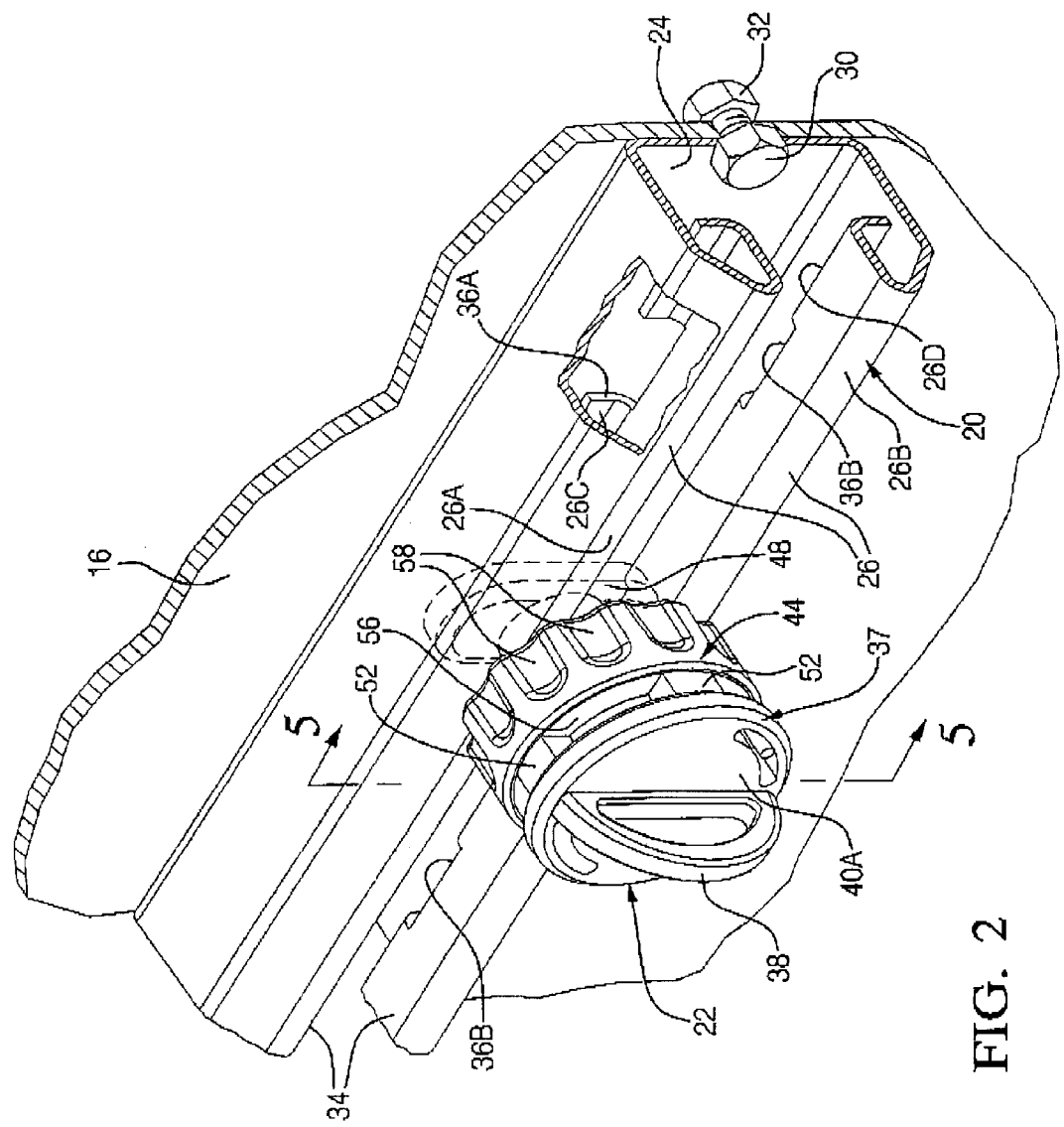
FIG. 2 is an enlarged three-dimensional view of one of the tie-down loops and a portion of one of the rails in FIG. 1 wherein a section of the rail is broken away to show one of the aligned pair of latching notches.

As shown in FIG. 2, the divided front wall 26 of the rail faces the cargo carrying space and comprises sections 26A and 26B that are bent inward of the rail to form a centrally located parallel-sided slot or channel 34 extending the length of the rail. The front wall sections 26A and 26B are additionally bent interior of the rail to form aligned terminal edge portions 26C and 26D that are at right angles to the sides of the channel 34 and lie in a common plane. A plurality of rectangular shaped latching notches 36A and 36B are formed in the terminal edge portions 26C and 26D, respectively, intersect at right angles with the channel 34, and are located on opposite sides of the channel in laterally aligned pairs at spaced locations along the length of the rail.

Figure 5:
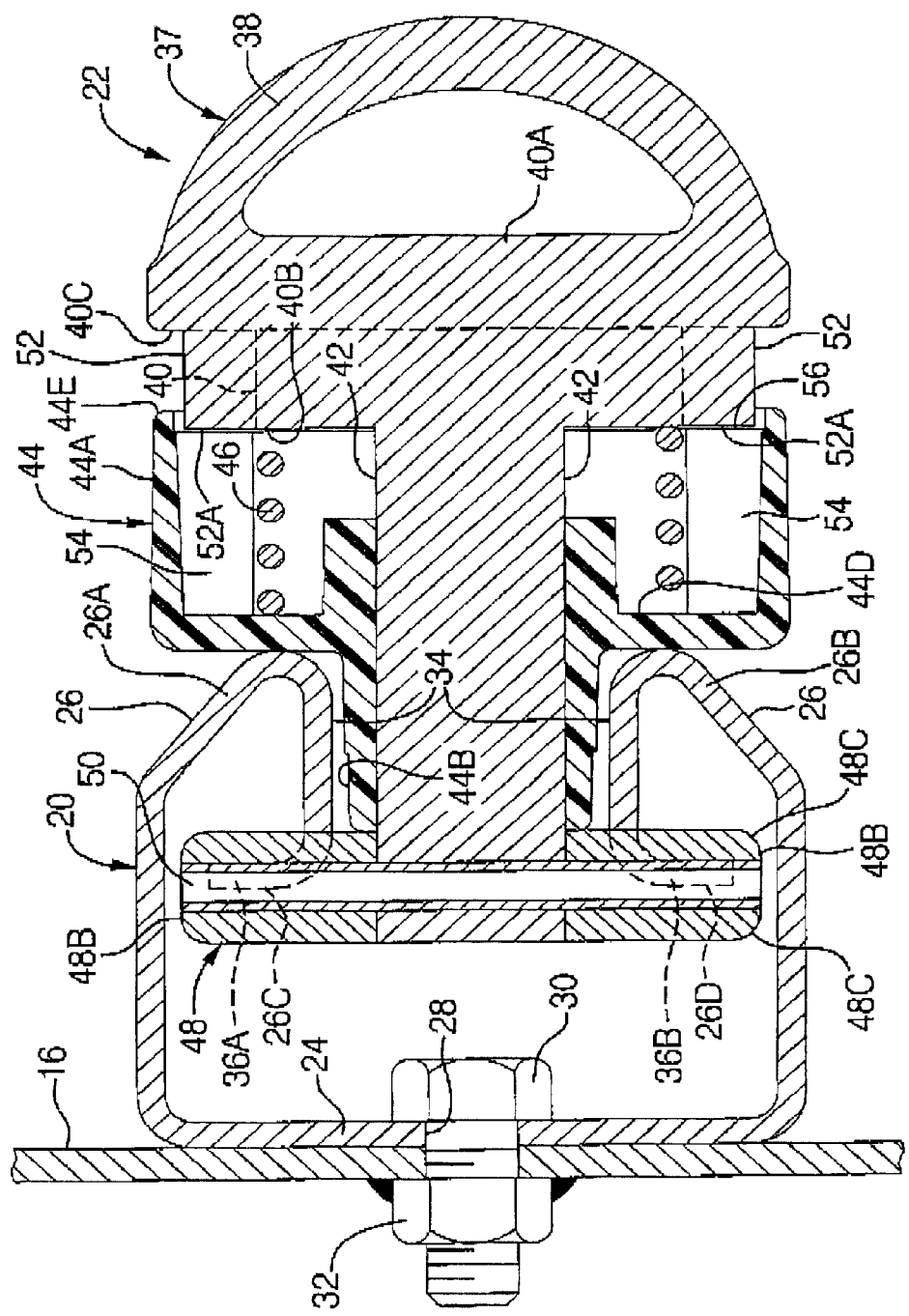
FIG. 5 is an enlarged view taken along the line 5—5 in FIG. 2 when looking in the direction of the arrows.

As shown in FIG. 5, the tie-down loops 22 each comprise a die cast aluminum alloy multi-feature part 37 having: a closed-loop portion or ring 38 for manual grasping as well as receiving a cargo restraining line (not shown), a cylindrical spring seat portion 40 with a cylindrical end section 40A of larger diameter at one end and from which the closed-loop portion 38 extends and forms a part thereof, and a co-axial considerably smaller diameter cylindrical portion 42 that extends centrally from the opposite or inner end of the spring seat portion 40.

An injection molded spring seat member 44 made of an acetal material or other suitable high strength, low friction plastic compound has a cylindrical cup-shaped spring seat portion 44A that is adapted to abut with the outer side of the front wall sections 26A and 26B of the rails at opposite sides of their channel 34. The seat member 44 also has a centrally located co-axial cylindrical collar portion 44B by which the spring seat member 44 is received on the small diameter cylindrical portion 42 of the tie-down loop part 37 and is capable of movement there along and turning relative thereto. A steel coil spring 46 is received about the small diameter cylindrical portion 42 between the flat radially extending annular bottom 44D of the spring seat portion 44A and the flat radially extending annular inner end 40B of the spring seat portion 40 of part 37.

The rails 20 are appearance parts in the vehicle and for that purpose are painted. The spring seat member 44 of the tie-down loops 22 by being made of a low friction plastic serves to prevent scraping or marring this painted surface during positioning and turning of the tie-on loops when inserted in the rails as described later. The material selection also prevents squeaks and rattles in the cargo restraint system. In addition, the visible portion of the tie-down loops is also an appearance item and being made of an aluminum alloy can for example be polished and coated, brushed and coated, color anodized or painted.

Figure 3:
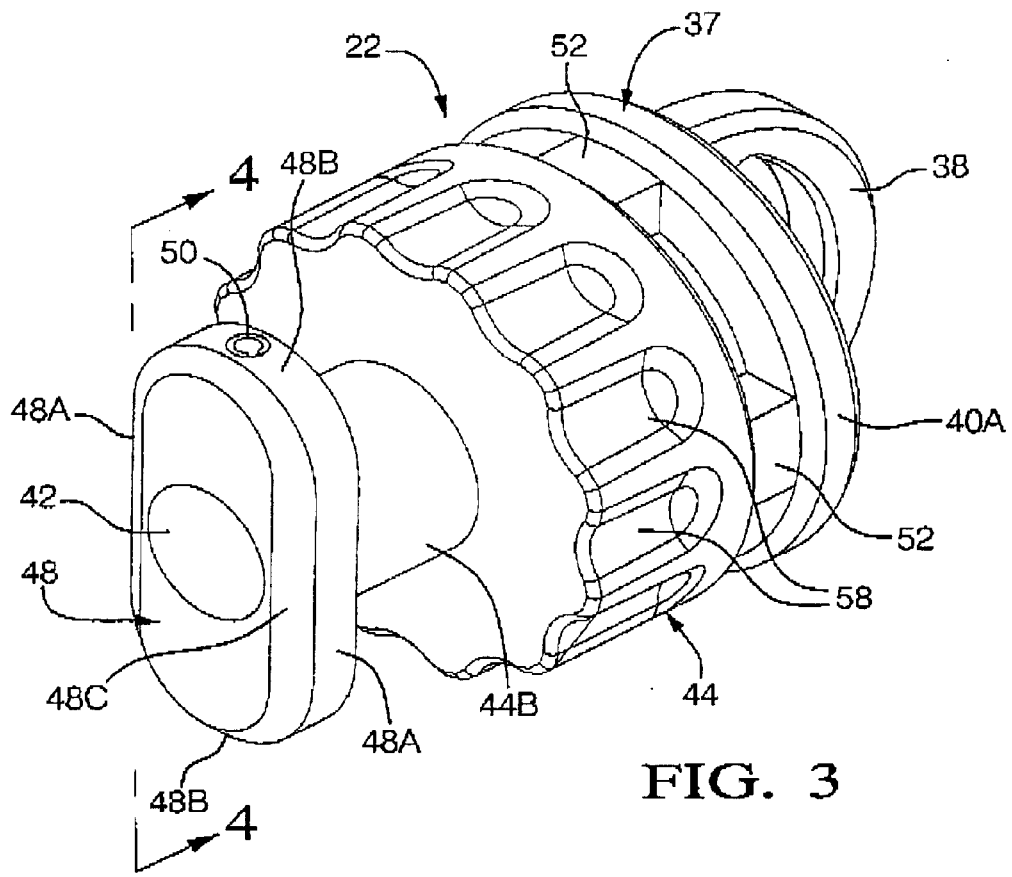
FIG. 3 is a three-dimension view of one of the tie-down loops in FIG. 1.
Figure 4:
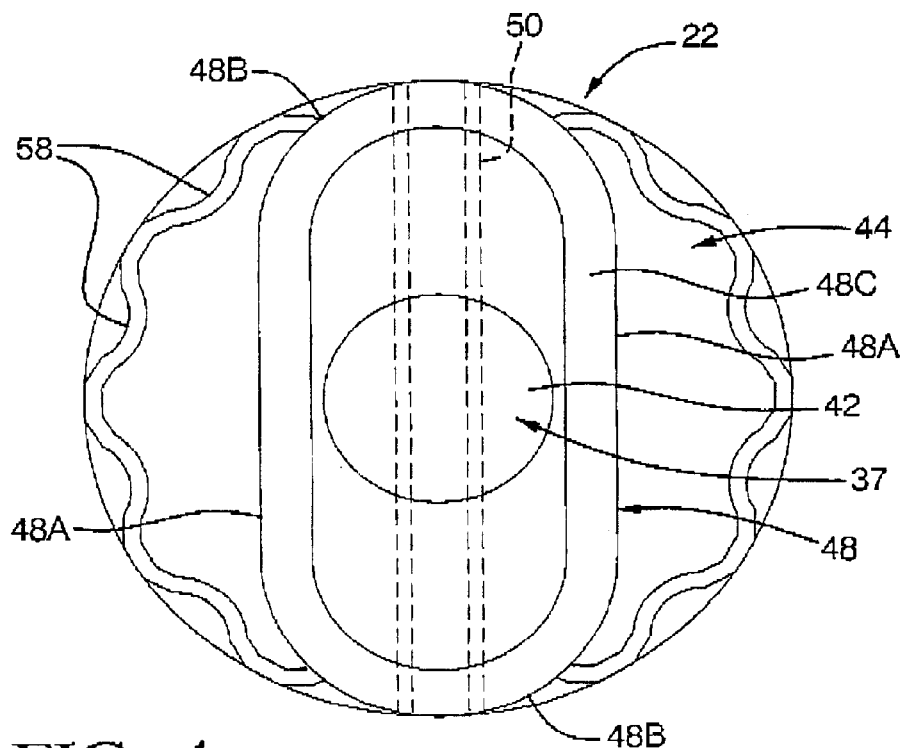
FIG. 4 is an enlarged view taken along the line 4—4 in FIG. 3 when looking in the direction of the arrows.

A die cast aluminum alloy oval-shaped pawl 48, also referred to as a locking bar, has two parallel sides 48A and rounded ends 48B and rounded edges 48C and is received at a central location on the distal end of the small diameter cylindrical portion 42 of the tie-down loops 22. See FIGS. 3–5. The pawl 48 is fastened to the small diameter cylindrical portion 42 in angular alignment with the closed loop section 38 by a metal shear/spring pin 50. The pawl 48 is adapted as shown in FIG. 5 to engage from within the rails by force from the spring 46 with a selected one of the pairs of latching notches 36A and 36B in the rails as described in more detail later.

The spring seat portion 40 of the tie-down loops 22 has six (6) equally-angularly-spaced, radially outwardly and axially extending, rectangular shaped lugs 52 that are joined at their outer end with the end section 40A and wherein two of the diagonally opposite lugs 52 are angularly aligned with the tie-down loop portion 38 and thus the pawl 48 for visual reference purposes to assist in orienting the pawl for latching after the pawl is inserted in the rail and then in a blind location. The lugs 52 are alignable with and receivable in similarly located and shaped internal slots 54 in the cup-shaped spring seat portion 44A (see FIGS. 2,5 and 7). The lugs 52 are alternatively locatable with their ends 52A opposite a radially extending annular surface 56 on the spring seat portion 44A. The spring seat portion 44A of the tie-down loops 22 also has annularly spaced indentations 58 about its periphery by which it is adapted to be manually grasped and be firmly held or turned for positioning and latching of the tie-down loops to the rails as described in detail below.

Next the positioning and latching of the tie-down loops 22 to the rails 20 by reference to one of the tie-down loops and rails and with the understanding that this description applies to all, will be described. A tie-down loop 22, while free of the rail to which it is to be latched (see FIGS. 3 and 6), is manually grasped at its closed loop portion 38 and separately so at the indented periphery of the spring seat member 44. These parts are then turned relative to each other so that the lugs 52 are then held by the spring 46 clear of the slots 54 in the spring seat member 44 and either in alignment therewith or opposite the annular surface 56 of the spring seat member 44. In either case, the tie-down loop portion 38 is manually oriented as shown in solid lines in FIG. 6 so that the pawl 48 connected thereto is aligned lengthwise with the channel 34 in the rail to which the tie-down loop is to be fastened. This may be performed at any position along the channel including at a location close to that pair of aligned latching notches 36A and 36B where the tie-down loop 22 is to be positioned and latched and locked to the rail.

Figure 6:
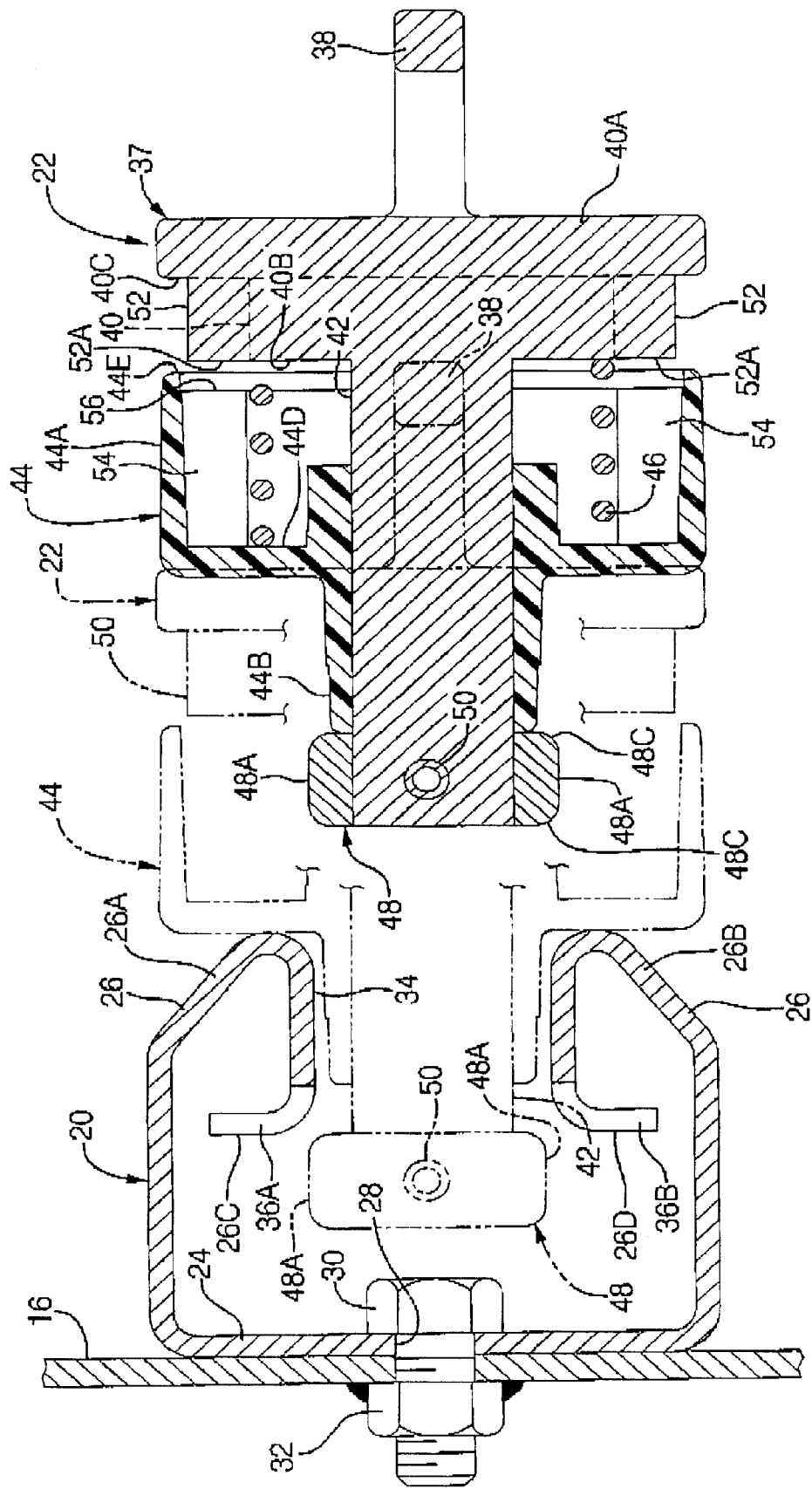
FIG. 6 is a view similar to FIG. 5 but showing the tie-down loop with the pawl oriented for insertion in the rail as shown in solid lines and with the pawl there after inserted through the channel as shown in phantom lines.

The tie-down loop 22 while so oriented is then manually moved toward the rail to cause the pawl 48 to enter and pass through the channel 34 while the spring seat member 44 is caused with such insertion movement to abut with the reverse bend in the front wall sections 26A and 26B as shown in phantom lines in FIG. 6. If the lugs 52 are not already aligned with the slots 54 as shown in FIG. 6, the lugs 52 are then caused to align with the slots 54 in the spring seat member 44 by small (less that 90 degrees) relative manual turning of the spring seat member relative to the tie-down loop portion 38.

The tie-down loop portion 38 with its integral spring seat portion 40 is then manually pushed against the force of the spring 46 causing the lugs 52 to enter the slots 54 while the pawl 48 is allowed with such entry of the lugs into the slots to extend to a fully extended position past the channel 34 into the interior of the rail and past the front wall terminal edge sections 26C and 26D as shown in phantom lines in FIG. 6. Wherein this fully extended position of the pawl is determined by a radially extending annular shoulder 40C on the inner end of the cylindrical spring seat section 40A abutting with an oppositely facing annular shoulder or edge 44E on the spring seat member 44.

Figure 7:
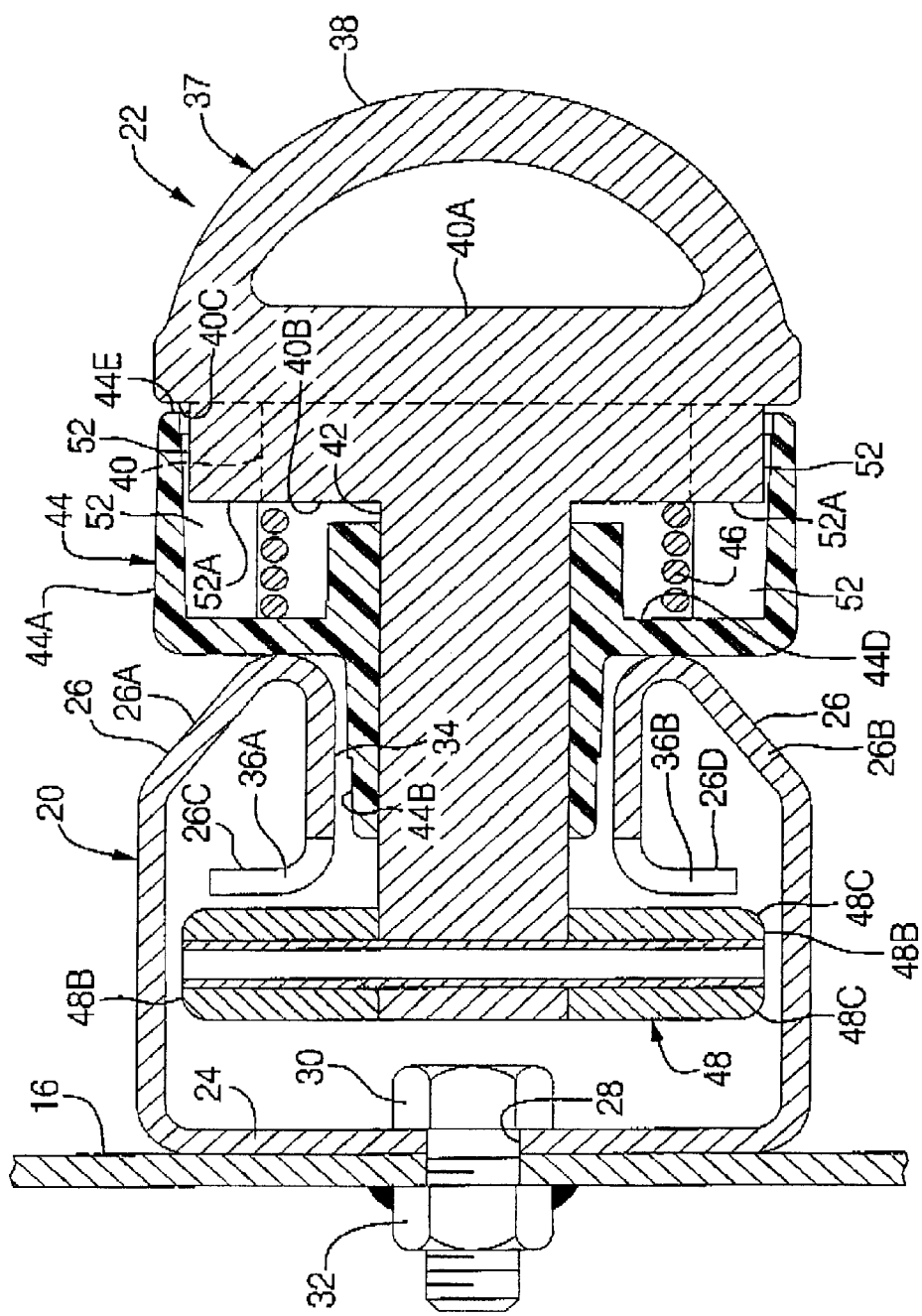
FIG. 7 is a view similar to FIG. 6 but showing the tie-down loop in a sequential condition wherein the pawl has been turned a half turn for positioning of the tie-down loop along and latching and locking to the rail.

The tie-down loop portion 38 is then manually turned a quarter turn (90 degrees) in either direction while the moveable spring seat member 44 is manually held against turning as shown in FIG. 7. The tie-down loop portion 38 is then released allowing the spring 46 to then force the pawl 48 outward to abut with the front wall terminal edge sections 26C and 26D where it may be slid there along. The tie-down loop 22 is then manually slid along the rail with the loop portion 38 in the direction of the aligned pair of latching notches 36A and 36B at the desired location. On reaching the latter, the spring 46 forces the pawl further outward to engage these notches and thereby firmly latch and lock the tie-down loop to the rail in the desired location while returning the closed loop portion 38 and integral ring seat portion 40 to a position where the lugs 52 are again clear of the slots 54. See FIG. 5.

If it is desired to unlatch and move the tie-down loop 22 along the rail to another latching location, the tie-down loop portion 38 with lugs 52 and slots 54 aligned is simply manually pushed against the spring 46 to move the pawl 48 inwardly to clear the notches 36A and 36B then engaged to thus permit the tie-down loop to be slid to any of the other pair of aligned latching notches. The tie-down loop may be released for such sliding movement to a new location whereby the pawl is again forced by the spring 46 against the front wall terminal edge sections 26C and 26D as described previously. In the event that the tie-down loop is released during such sliding tie-down loop movement and there are any intervening pairs of latching notches in the direction of the new tie-down loop relocation, the tie-down loop portion 38 is simply manually pushed against the force of the spring so that the pawl remains clear of these intervening notches until the desired pair of latching notches is reached whereupon the tie-down loop portion is only then released allowing the spring to engage the pawl with the selected notches.

To remove the tie-down loop 22 from the rail, the loop portion 38 is manually pushed against the force of the spring 46 to clear or release the pawl 48 from its engagement with a pair of the latching notches. The loop portion 38 is then turned a quarter turn (90 degrees) in either direction thereby aligning the pawl with the channel 34 and allowing the tie-down loop to be removed from the rail.

It will also be appreciated that since the channel is open at both ends, the tie-down loop 22 may initially be inserted in the rail through one of these ends by manually causing sufficient compression of the spring 46 to allow the pawl 48 while transverse of the channel to clear the front wall terminal edge sections 26C and 26D. The pawl can also be aligned lengthwise with the channel and be slid into the channel. In either case, the tie-down loop can then be positioned by sliding along the rail and its pawl then oriented for latching and locking in a desired location on the rail as described above.

The tie-down loops 22 as so constructed are for example each capable of withstanding a high static load or force such as about 250 pounds but require only a small force such as about three pounds to fully insert and twist the tie-on loop when fastening same to the rail. The shear/spring pin 50 in the tie-down loops 22 is provided to absorb shock loads and shear at a highly excessive load to release the pawl 48 to prevent the associated rail 20 from buckling the vehicle structure where the rail is fixed thereto.

For purposes of demonstrating and explaining the versatility of the invention, there have been shown two rails 20 in FIG. 1 which are arranged parallel with each other and there have been shown three tie-down loops 22 with one tie-down loop latched and locked to the upper rail at a generally central location and the other two tie-down loops latched and locked to the lower rail at locations near the opposite ends of this rail. As stated earlier, it will be understood that a similar arrangement of like rails and tie-down loops are associated with the opposite side of the vehicle structure. However, it will also be understood that there may be only one rail per side with only one tie-down loop or there may be more rails and more tie-down loops per rail depending on the restraint system desired for a particular cargo. It will also be understood that one or more of the rails can for example be fastened to vehicle side structure that is transverse to the cargo floor and in various orientations, can be fastened to the cargo floor and also in various orientations, and also can be fastened to the cargo carrying roof of a motor vehicle and also in various orientations.

The above-disclosed exemplary embodiments are thus intended to be illustrative of the invention and it is foreseeable that various modifications thereof will become apparent to those skilled in this art by this enabling disclosure. Therefore it is intended that the present invention be limited only by the scope of the appended claims.

What is claimed is:

1. A motor vehicle cargo restraint system comprising at least one rail adapted to be fastened to a cargo carrying region of a motor vehicle, said rail having a longitudinally extending channel and a plurality of first latching means located on opposite sides of said channel in laterally aligned pairs at spaced positions along the length of said channel, at least one cargo tie-down loop adapted to receive a cargo restraining line, said tie-down loop having second latching means adapted to be received through said channel and then by manual pushing on and then partial turning of said tie-down loop and then manual positioning of said tie-down loop along said rail be selectively located opposite said pairs of said first latching means, and said second latching means being further adapted on manual release of said tie-down loop to engage with a selected pair of said first latching means to firmly latch and lock said tie-down loop to said rail in one of a plurality of selectable tie-down loop positions located along said rail.

2. A motor vehicle cargo restraint system as defined in claim 1 wherein said first latching means are notches, and said second latching means includes a pawl and a spring wherein said pawl is configured to pass freely through said channel when said pawl is manually arranged with said tie-down loop in parallel alignment with said channel, and wherein said spring is co-operatively arranged with respect to said pawl and said rail when said pawl is passed through and then turned transverse to said channel by said tie-down loop so that said spring forces said pawl to engage with a selected pair of said notches on release of said tie-down loop.

3. A motor vehicle cargo restraint system as defined in claim 2 wherein said tie-down loop has a closed loop portion and a spring seat portion joined directly to said closed loop portion and a cylindrical portion joined directly to said spring seat portion, a spring seat received about said cylindrical portion, said spring is received about said cylindrical portion between said spring seat portion and said spring seat, said pawl is fixed to a distal end of said cylindrical portion in angular alignment with said closed loop portion, and said spring seat is adapted to engage with said rail on insertion of said pawl through said channel and force compression of said spring by manual pushing force on said closed loop portion and said spring seat portion and on release of said manual pushing force and turning of said closed loop portion relative to said cylindrical portion and said rail to align said pawl with a selected aligned pair of said notches said spring forces engagement of said pawl with the selected pair of said notches.

4. A motor vehicle cargo restraint system as defined in claim 3 wherein said spring seat is manually turnable with respect to said spring seat portion, and said spring seat portion has lugs that are angularly aligned with said closed loop portion and are angularly alignable with and receivable in slots in said spring seat with relatively turning of said spring seat to allow said spring seat portion to move toward said spring seat to compress said spring when said tie-down loop portion and said spring seat portion are manually pushed.

5. A motor vehicle cargo restraint system as defined in claim 3 wherein said rail is a painted metal part and said spring seat is a plastic part to prevent scraping of said rail by said spring seat and also to prevent squeaks and rattles in the cargo restraint system.

* * * * *